H. H. VANDEGRIFT.
MOLD FOR MOLDING CONCRETE STAIRS.
APPLICATION FILED FEB. 9, 1915.
1,173,066.
Patented Feb. 22, 1916.
2 SHEETS—SHEET 2.
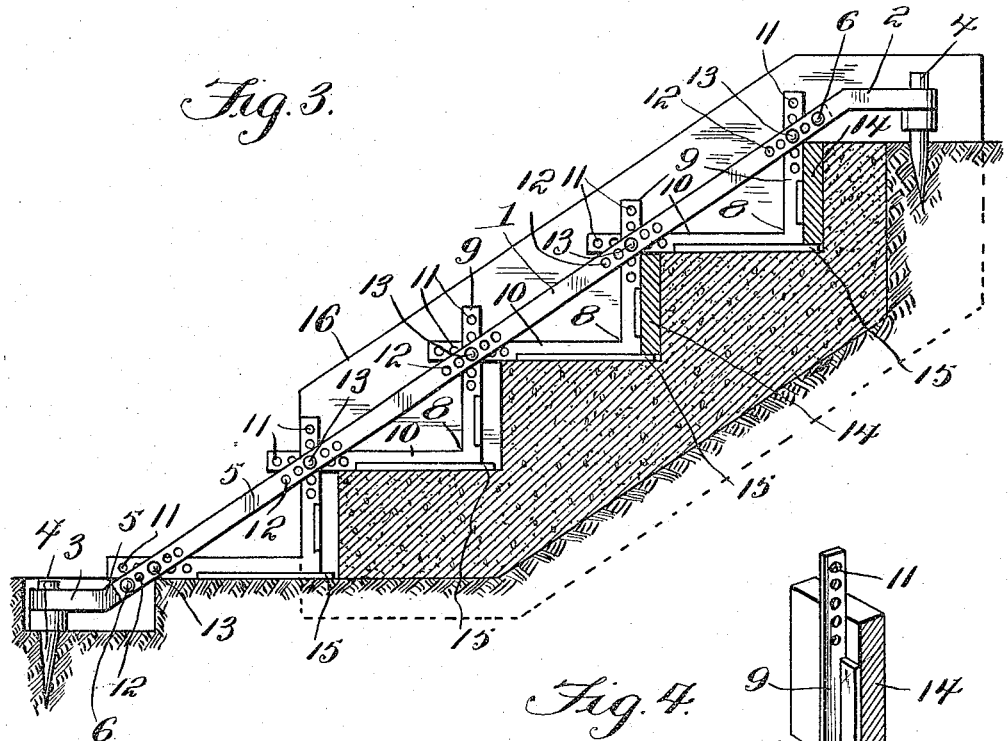
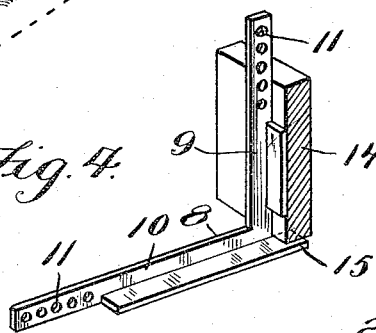
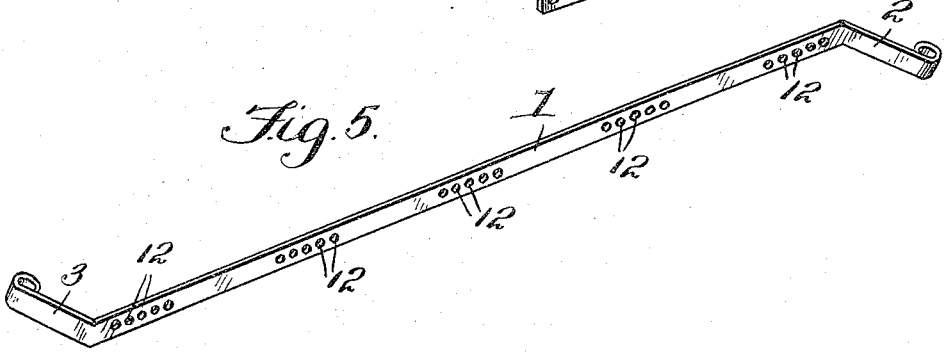
Witnesses
Inventor
H. H. Vandegrift
By Victor J. Evans
Attorney ofon # UNITED STATES PATENT OFFICE.

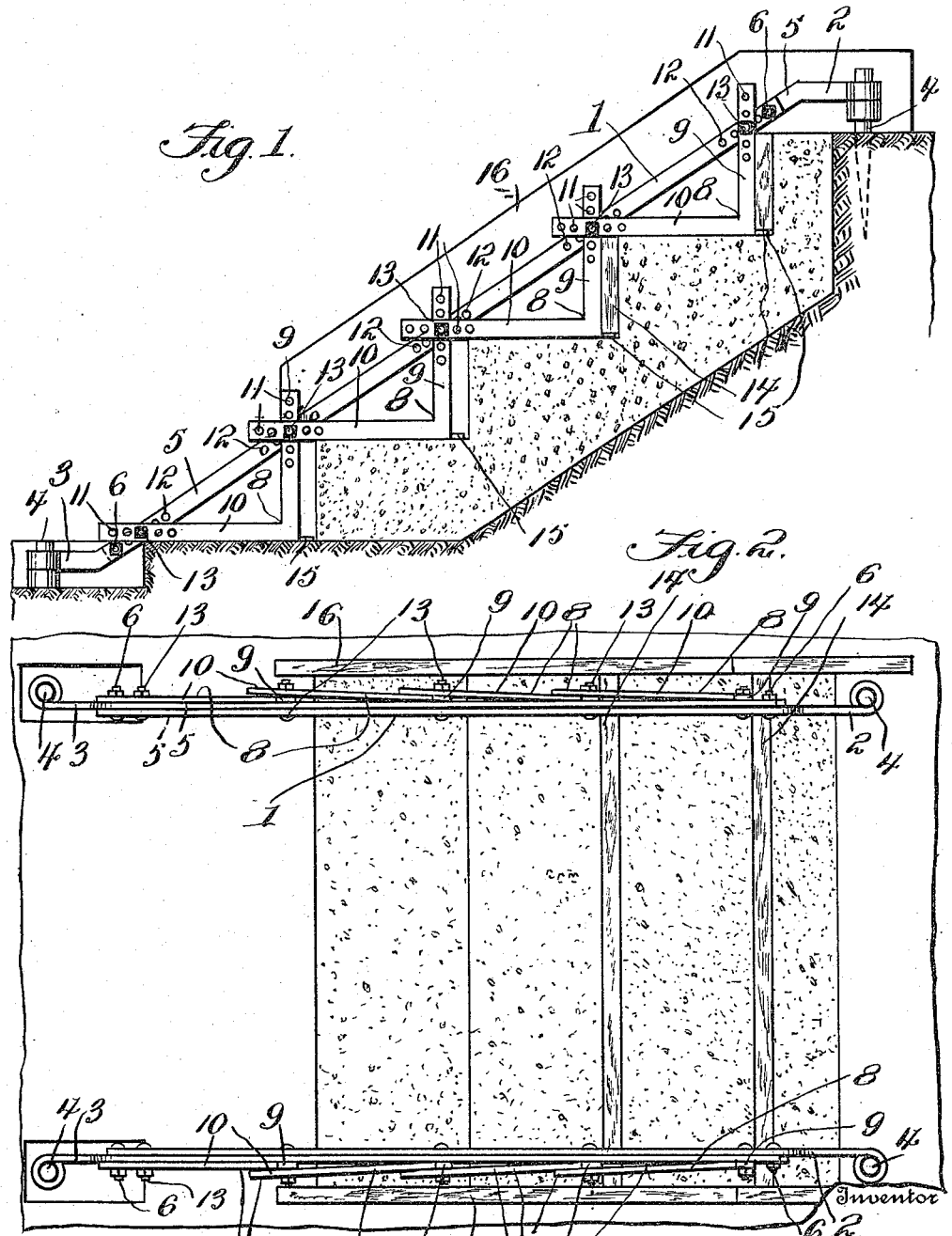

HARRY H. VANDEGRIFT, OF CLARKSBURG, WEST VIRGINIA.

MOLD FOR MOLDING CONCRETE STAIRS.

1,173,066.  Specification of Letters Patent.  Patented Feb. 22, 1916.

Application filed February 9, 1915. Serial No. 7,043.

*To all whom it may concern:*

Be it known that I, HARRY H. VANDEGRIFT, a citizen of the United States, residing at Clarksburg, in the county of Harrison and State of West Virginia, have invented new and useful Improvements in Molds for Molding Concrete Stairs, of which the following is a specification.

This invention relates to improvements in molds especially adapted for use in molding concrete stairs, the object of the invention being to provide an improved mold of this character which comprises carriage bars and detachable and adjustable gage members adapted for holding the riser boards and for adjustment to permit stairs to be molded with treads and risers of any desired dimensions, a further object being to provide an improved mold of this character which may be used indefinitely on a number of stairs and in which the riser boards do not have to be injured by sawing.

The invention consists of the novel features, details of construction and combination of parts, which hereinafter will be more particularly set forth, illustrated and claimed.

In the accompanying drawings: Figure 1 is a side elevation of a stair mold constructed in accordance with my invention showing the same in use in molding concrete stairs. Fig. 2 is a plan view of the same. Fig. 3 is a vertical sectional view of the same. Fig. 4 is a detail elevation of one of the gages.

In accordance with my invention I provide carriage bars 1, which may be of any suitable length and each of which is provided at its upper and lower ends with horizontally extending arms 2 and 3 adapted to be secured on stems or other suitable supports 4 which may be driven in the ground or otherwise arranged at the head and foot of the proposed stairs. The carriage bars may be integral or may be formed of two or more sections or members 5 adjustably and detachably secured together as at 6 so that the carriage bars may be adjusted to any desired length.

In connection with the carriage bars, I provide gage elements 8 each of which is here shown as having a vertical arm 9 and a horizontal arm 10 for the risers and treads of the molded stairs. The said arms are provided with adjusting openings 11 and the carriage bars are also provided with adjusting openings 12. Suitable pins or bolts 13 may be placed in appropriate adjusting openings in the carriage bars and in the arms of the gage elements so that the latter may be detachably secured to the carriage bars and arranged on the under sides thereof to regulate the width of the treads and the height of the stairs as may be desired. The horizontal arm 10 of each gage member is arranged across the vertical arm 9 of the next adjacent gage member so that the pins or bolts are common each to two of the gage members.

The riser boards 14 are arranged to bear against the inner sides of the vertical arms of the gage members and under the horizontal arms of the adjacent gage members and each riser board is supported on suitable supporting studs or other devices 15 with which the gage members are provided at the angles between the arms. The gage members do not have to be sawed or otherwise injured while the mold is being used and after the steps have been molded and "set" the riser boards may be removed and attached to higher gage members for use on more elevated steps, thus effecting a great economy of lumber and enabling a riser board to be used perhaps several times in one mold while molding the steps. The cheek or side pieces 16 of the mold may be of any suitable construction.

Having thus described the invention, what is claimed is:—

A stair mold comprising flat carriage bars disposed edgewise and provided with a plurality of openings, the opposite ends of said bars being extended to provide parallel arms, the latter terminating to provide loops, gage members each comprising a vertical arm and a horizontal arm, said arms having openings to register with the said openings of the bars, fastening elements passed through the alined openings for holding said parts in adjusted position, and a right angularly disposed flange projecting from each of the said vertical and horizontal arms of the gage member for the purpose described.

In testimony whereof I affix my signature in presence of two witnesses.

HARRY H. VANDEGRIFT.

Witnesses:
 WM. REICHER,
 F. E. TOWNSEND.

Copies of this patent may be obtained for five cents each, by addressing the "Commissioner of Patents, Washington, D. C."